United States Patent [19]
Shimizu et al.

[11] Patent Number: 6,041,884
[45] Date of Patent: Mar. 28, 2000

[54] ELECTRIC POWER STEERING APPARATUS

[75] Inventors: Yasuo Shimizu; Akio Kobayashi; Osamu Tsurumiya; Takao Kurosawa; Nobuo Sugitani; Yoshinobu Mukai; Yoshiki Noro, all of Wako, Japan

[73] Assignee: Honda Giken Kogyo Kabushiki Kaisha, Tokyo, Japan

[21] Appl. No.: 09/152,228

[22] Filed: Sep. 11, 1998

[30] Foreign Application Priority Data

Sep. 12, 1997 [JP] Japan ................................. 9-248439

[51] Int. Cl.⁷ ........................................ B62D 5/04
[52] U.S. Cl. ........................... 180/443; 180/446; 701/41
[58] Field of Search ................................ 180/442, 443, 180/446; 701/36, 41, 42, 43, 44

[56] References Cited

U.S. PATENT DOCUMENTS

| | | | |
|---|---|---|---|
| 4,765,425 | 8/1988 | Saito et al. | 180/79.1 |
| 4,956,590 | 9/1990 | Phillips | 318/432 |
| 4,987,964 | 1/1991 | Tabuse | 180/79.1 |
| 5,259,473 | 11/1993 | Nishimoto | 180/79.1 |
| 5,303,156 | 4/1994 | Matsuoka et al. | 364/424.05 |
| 5,485,067 | 1/1996 | Nishimoto et al. | 318/466 |
| 5,652,487 | 7/1997 | Nishino et al. | 318/434 |
| 5,699,874 | 12/1997 | Miyaura | 180/443 |
| 5,927,430 | 7/1999 | Mukai et al. | 180/446 |

*Primary Examiner*—Brian L. Johnson
*Assistant Examiner*—Daniel Yeagley
*Attorney, Agent, or Firm*—Merchant & Gould P.C.

[57] ABSTRACT

An electric power steering apparatus comprises a motor for applying an auxiliary torque to a steering system, a steering torque sensor for detecting a steering torque in the steering system and a control unit for drive-controlling the motor based on at least a steering torque signal from the steering torque sensor. The control unit includes a motor control unit and a failure detecting unit for detecting a failure of the control unit. Based on a failure detection signal from the failure detecting unit, the motor drive control unit switches over from a normal mode in which no failure exists in the apparatus to a first failure mode in which a certain failure exists in the apparatus and an assist ratio is changed to about half of that of the normal mode.

5 Claims, 3 Drawing Sheets

ELECTRIC POWER STEERING APPARATUS

BACKGROUND OF THE INVENTION

1. Field of the Invention

The present invention relates to an improvement in an electric power steering apparatus wherein a motor is driven by computer control based on signals from various kinds of sensors for adding a drive force of the motor to a steering system.

2. Description of the Related Art

In a conventional electric power steering apparatus, a steering torque arising from the operation of a steering wheel by a driver is detected by a steering torque sensor and a motor for providing an auxiliary torque is drive-controlled by a microcomputer based on a detected steering torque signal and signals from a vehicle speed sensor or the like. In this apparatus, there is provided only one control system having the microcomputer.

The conventional electric power steering apparatus is arranged such that when abnormality of the apparatus is detected due to failure of the vehicle speed sensor or the like, the supply of the auxiliary torque is restricted by fixing a motor current at the middle part of a vehicle-speed-responsive control range, or depending on the nature of failure of the apparatus, the function of the system per se is stopped.

However, problems arise when control of the conventional electric power steering apparatus is carried out by the single control system or when simply two control systems are provided in the apparatus.

In the electric power steering apparatus having only one control system, failure of part of the apparatus may result in stoppage of the entire apparatus. Further, the apparatus is incapable of performing control over various kinds of failures therein in correspondence with the extent of those failures.

Similarly, in the apparatus having two control systems which are independent from each other, when part of one control system (for example, one sensor) fails, the entire control system fails to function, thereby requiring switchover to the other control system. Further, such a switchover arrangement does not make the failure of the one control system known to a driver.

SUMMARY OF THE INVENTION

It is therefore an object of the present invention to provide an electric power steering apparatus which, when failure occurred in a control system thereof, can continue its operation as long as possible to apply an auxiliary torque to a steering system and can make the failure known to a driver.

According to a first aspect of the present invention, there is provided an electric power steering apparatus for use on a vehicle, which comprises a motor for applying an auxiliary torque to a steering system of the vehicle, a steering torque sensor for detecting a steering torque of the steering system, and a control unit including a motor control unit for drive-controlling the motor based on at least a steering torque signal from the steering torque sensor and a failure detecting unit for detecting failure of the apparatus, wherein the motor control unit, based on a failure detection signal from the failure detecting unit, switches over from a normal control mode in which no failure exists in the apparatus to a first failure mode in which a certain failure exists in the apparatus and an assist ratio is changed relative to the normal control mode.

When there arises a failure in the apparatus, the motor control unit is switched over from the normal mode to the first failure mode in which the assist ratio is changed to thereby enable continued application of an assist torque to the steering system and hence continued operation of the apparatus. In the preferred embodiment, the assist ratio is changed to about a half of that of the normal mode.

According to a second aspect of the present invention, there is provided an electric power steering apparatus for use on a vehicle, which comprises a motor for applying an auxiliary torque to a steering system of the vehicle, a steering torque sensor for detecting a steering torque of the steering system, and a control unit having a motor control unit for drive-controlling the motor based on at least a steering torque signal from the steering torque sensor and a failure detecting unit for detecting a failure of the apparatus, wherein each of the motor control unit and the failure detecting unit is provided in a couple, one of the two motor control units performs its control operation in a normal control mode when neither of the two failure detecting units detects a failure, and the other of the two motor control units performs its control operation in a first failure control mode in which an assist ratio differs from that of the normal control mode when one of the two failure detecting units detects a failure.

In the electric power steering apparatus thus arranged, when one of the failure detecting units detects a specific failure, the control is carried out by the first failure control mode in which the assist ratio differs from that of the normal mode. Accordingly, occurrence of the failure can be informed to the driver by changing the assist ratio and auxiliary torque can continuously be applied to the steering system. When a minor failure is detected by the failure detecting units, the control is carried out at one of the control units in a second failure control mode in which the assist ratio is no different from that of the normal control mode and even when the minor failure arises, the auxiliary torque can continuously be applied to the steering system by an assist ratio which is the same as that of the normal control mode. Accordingly, even when failure arises, a steering feel the same as that in the normal time can be provided.

According to a third aspect of the present invention, there is provided an electric power steering apparatus for use on a vehicle, which comprises a motor for applying an auxiliary torque to a steering system of the vehicle, a steering torque sensor for detecting a steering torque of the steering system, and a control unit having a motor control unit for drive-controlling the motor based on at least a steering torque signal from the steering torque sensor and a failure detecting unit for detecting a failure of the apparatus, wherein each of the motor control unit and the failure detecting unit are provided in a couple, one of the two motor control units performs its control operation in a normal control mode when neither of the two failure detecting units detects a failure, and the one of the two motor control units performs its control operation in a first failure control mode in which an assist ratio differs from that of the normal control mode when the other of the two failure detecting units detects a failure.

In the electric power steering apparatus thus arranged, in contrast to the apparatus according to the second aspect, when the other failure detecting unit detects a certain failure, the control is carried out by the first failure control mode in which the assist ratio differs from that of the normal mode and occurrence of the failure is informed to the driver by changing the assist ratio. The auxiliary torque from the motor is continuously applied to the steering system. When the failure detecting units detect the minor failure, the control is carried out by the second failure control mode in which the assist ratio is no different from that of the normal mode.

BRIEF DESCRIPTION OF THE DRAWINGS

Certain preferred embodiments of the present invention will be described in detail hereinbelow, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Generally, an electric power steering apparatus according to the present invention is arranged such that when a certain failure arises in a control system thereof, the failure is informed to a driver through a change in a steering feel by changing an assist ratio and application of an assist torque to the steering system is continued in accordance with the changed assist ratio.

Figure 1:
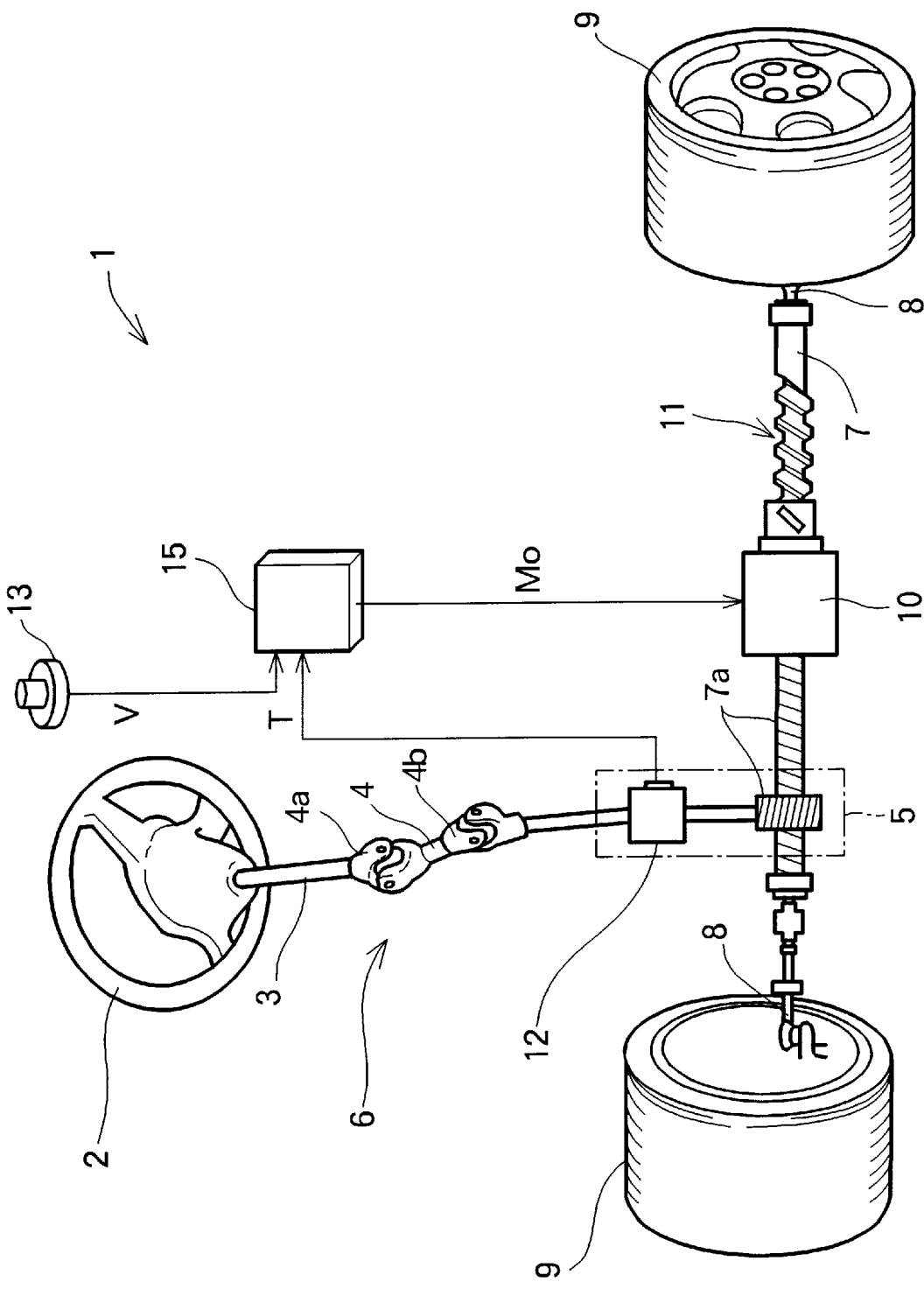
FIG. 1 is a schematic view showing the general arrangement of an electric power steering apparatus according to the present invention.

Referring to FIG. 1, the electric power steering apparatus 1 comprises manual steering force generating means 6 which includes a steering shaft 3 connected at one end to a steering wheel 2 and connected at the other end, via a connecting shaft 4 having universal joints 4a, 4b, to a variable gear ratio steering mechanism (VGS) enclosed in a steering gearbox 5.

A rack shaft 7 is reciprocally moved by a rack-and-pinion mechanism 7a. The rack-and-pinion mechanism 7a includes the variable gear ratio steering mechanism (VGS) of which gear ratio is varied by a motor housed in the steering gearbox 5. Right and left front steered wheels 9, 9 are connected to respective ends of the rack shaft 7 via tie rods 8, 8.

Upon operation of the steering wheel 2, the gear driving motor is controlled via the manual steering force generating means 6 so that the gear ratio becomes large at a middle position of the steering wheel where a vehicle runs linearly and becomes small at a lock (limit) position of the steering wheel and a rotational movement of the steering wheel is converted into a reciprocal movement via the rack-and-pinion mechanism 7a to thereby turn the direction of the front wheels and hence the vehicle.

An electric motor 10 for supplying the steering system with an auxiliary steering force is provided coaxially with the rack shaft 7. A ball screw mechanism 11 is also arranged coaxially therewith.

A steering torque sensor 12 converts a detected steering torque into an electric signal. The converted torque signal T is fed to a control unit 15. The steering torque sensor 12 is constituted by, for example, a differential transformer for detecting, in the form of a differential output, a voltage corresponding to the steering force. The steering torque sensor 12 outputs a torque signal T corresponding to the rotational steering direction and an amount of its torque.

Within the steering gearbox 5, there are provided a cam for varying an amount of eccentricity of rotational movement corresponding to a gear ratio of the variable gear ratio steering mechanism and a motor for rotating the cam.

The control unit 15 has a motor control unit, a motor driving unit, a failure detecting unit and a mode converting unit. It is controlled to provide, based on the steering torque signal T from the steering torque sensor 12, a steering assist force for assisting in the turning of the steering wheel 2 in correspondence with a vehicle running state by PWM-driving the motor 10 using a control signal (e.g., PWM signal) of the motor control unit via the motor driving unit (e.g., H bridge circuit using an FET).

When a failure is detected by the failure detecting unit, the control unit 15 switches its normal control mode to a failure control mode, or vice versa, depending on the contents of the failure. When a failure is detected by the failure detecting unit and the mode is switched to the normal control mode, only the steering feeling becomes no good and a signal from the motor driving unit to the motor 10 remains unchanged from the normal (not failure) occasion.

Further, when a failure is detected by the failure detecting unit and the mode is switched to the failure control mode, an assist ratio is changed relative to that of the normal control mode (for example, to ½) based on a signal from the motor driving unit in respect of the motor 10 and a feeling as a steering feel is provided to a driver to make him sense the occurrence of failure physically. In either of the normal control mode and the failure control mode, the failure is make known to a driver or a passenger by visible information such as turning on or winking a lamp, or by audio information such as a buzzer or voice of a speaker.

Further, two steering torque sensors and two control units are provided so that when a main or primary control unit detects a partial failure in the electric power steering apparatus, e. g., in a main or primary steering torque sensor, the motor driving unit or the like, the main control unit is switched to a secondary control unit to enable continued operation of the electric power steering apparatus.

When control of the motor or the steering torque sensor fails, the VGS drive for driving the motor to vary the gear ratio of the variable gear ratio steering mechanism (VGS) is caused to function independently and controlled to enable continued steering.

Figure 2:
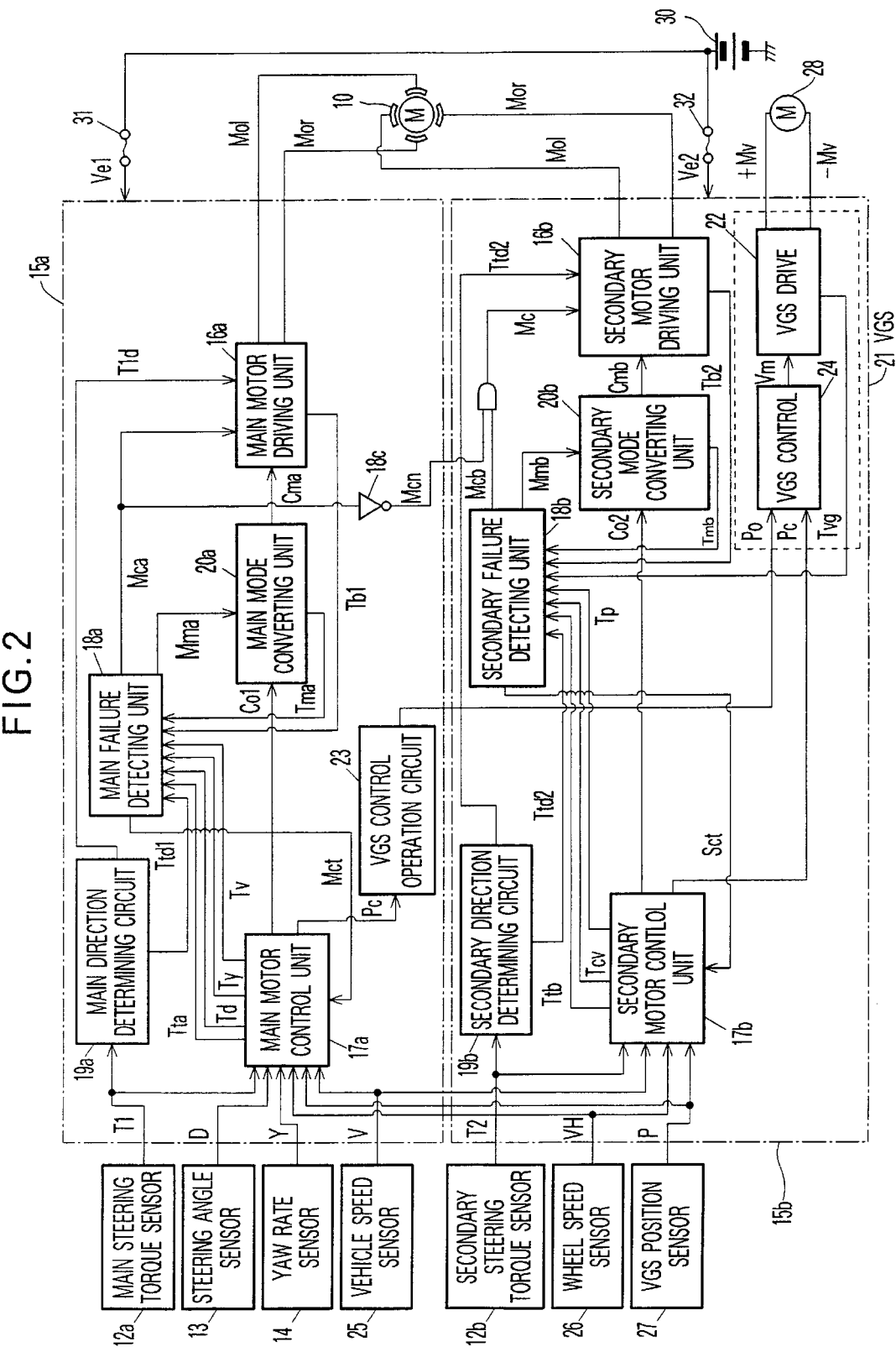
FIG. 2 is a block diagram illustrating particularly control units of the electric power steering apparatus of FIG. 1.

Reference is now made to FIG. 2 which is a block diagram showing the control unit of the inventive electric power steering apparatus.

In the illustrated embodiment, there are provided one motor, two steering torque sensors and two control units. By controlling a motor driving signal based on a detected steering torque, the motor is driven. When a failure of the control unit or the steering torque sensor is minor, a steering feel is deteriorated by an amount of loss of a sensor signal to the motor control unit but thee occurs no change in an assist amount from the motor.

When a failure occurs in the systems like the control unit and the steering torque sensor, or when a major or serious failure occurs therein, an amount of drive of the motor is reduced by a mode converting unit for changing an assist ratio by controlling the motor control signal, whereby the failure is made known to the driver or the like through a steering feel.

When the system like the main control unit or steering torque sensor fails, it is switched to a secondary control unit or a secondary steering torque sensor or the like and the motor is driven constantly by controlling the motor control signal based on a steering torque without any interruption of control of the motor control signal.

When the main and secondary control units or steering torque sensors fail, the control is carried out without interruption of steering by independently functioning the VGS drive unit for driving the motor by varying the gear ratio of the variable gear ratio steering mechanism (VGS).

In FIG. 2, the electric power steering apparatus (EPS) is constituted by a main steering torque sensor 12a and a secondary steering torque sensor 12b, a steering angle sensor 13, a yaw rate sensor 14, a vehicle speed sensor 25, a wheel speed sensor 26, a VGS position sensor 27, a main control unit 15a and a secondary control unit 15b, a VGS motor 28 and a motor 10. Power is supplied from a power source 30 to respective control units of the main control unit 15a and the secondary control unit 15b.

Sensors of the main control unit 15a are the main steering torque sensor 12a, the steering angle sensor 13, the yaw rate sensor 14 and the vehicle speed sensor 25. The main steering torque sensor 12a is constituted by a differential transformer for detecting a voltage corresponding to a steering force by the steering wheel in a differential output. The steering angle sensor 13 is constituted by, for example, a rotary slit plate and a photocoupler. The yaw rate sensor 14 is constituted by, for example, a two-dimensional acceleration sensor. The vehicle speed sensor 25 is constituted by, for example, a tone wheel sensor and a coil equipped with a permanent magnet.

Sensors of the secondary control unit 15b are the secondary steering torque sensor 12b, the wheel speed sensor 26 and the VGS position sensor 27. The secondary steering torque sensor 12b is constituted by a differential transformer similar to that of the main steering torque sensor 12a. The wheel speed sensor 26 is constituted by, for example, a rotary slit plate and a photocoupler. The VGS position sensor 27 is constituted by, for example, a differential transformer.

The main steering torque sensor 12a and the secondary steering torque sensor 12b are particularly important sensors and supply respective signals to the main control unit 15a and the secondary control unit 15b in preparation for respective independent control.

The main steering torque sensor 12a supplies a torque signal T1 corresponding to the rotational direction and the torque amount of steering, to a main direction determining circuit 19a and a main motor control unit 17a.

The vehicle speed sensor 25 and the wheel speed sensor 26 are important sensors with respect to behavior of the vehicle. Because the vehicle speed and wheel speed have equivalent operations and objects and provide equivalent values, the signals of the vehicle speed sensor 25 and the wheel speed sensor 26 are supplied to the main control unit 15a and the secondary control unit 15b so that no problem arises in the control operation when either of the sensors fails. The main control unit 15a and the secondary control unit 15b are provided with a function of monitoring failure of the control units of each other and a function of determining failure of a sensor per se by comparing the vehicle speed at the respective control units for detecting the failure of the sensor per se.

The vehicle speed sensor 25 is installed at a driving shaft for outputting a vehicle speed signal V corresponding to the forward and rearward directions and the speed of the vehicle. The vehicle speed signal V is supplied to the main motor control unit 17a and the secondary motor control unit 17b.

The wheel speed sensor 26 outputs a wheel speed signal VH corresponding to a rotational speed of non-driven wheels of the vehicle. The wheel speed signal VH is supplied to the main motor control unit 17a and the secondary motor control unit 17b.

An output signal of the VGS position sensor 27 is supplied to the main control unit 15a and the secondary control unit 15b. The VGS position sensor 27 per se is double checked by the two control units. The VGS position sensor 27 outputs a VGS position signal P corresponding to a variable amount and a variable direction of the gear ratio. The position signal P is supplied to the main motor control unit 17a and the secondary motor control unit 17b.

The steering angle sensor 13 outputs a steering angle signal D corresponding to a rotational direction of the steering wheel and a rotational angle of steering in order to control a reaction force upon turning of the steering wheel. The steering angle signal D is supplied to the main motor control unit 17a.

The yaw rate sensor 14 outputs a yaw rate signal Y in accordance with a yaw rotational direction and a yaw rate associated with yaw motion of the vehicle in order to control a reaction force upon turning of the steering wheel in respect of road behavior (e.g., an assist ratio in respect of the steering system is reduced when yaw motion occurs). The yaw rate signal Y is supplied to the main motor control unit 17a.

The main control unit 15a is basically constituted by a microprocessor and is provided with the main motor control unit 17a, a main motor driving unit 16a, a main failure detecting unit 18a, a main mode converting unit 20a, the main direction determining circuit 19a and a VGS control operation circuit 23. The main control unit 15a outputs motor drive signals Mol and Mor for drive-controlling the motor 10 based on signals from the main steering torque sensor 12a, the steering angle sensor 13, the yaw rate sensor 14, the vehicle speed sensor 25, the wheel speed sensor 26 and the VGS position sensor 27.

The main motor control unit 17a outputs a control signal Co1 which is a motor control amount corresponding to amounts of change based on respective directions and absolute values on the basis of the torque signal T1 corresponding to the torque amount from the main steering torque sensor 12a, the steering angle signal D corresponding to the rotational direction and the rotational angle of steering from the steering angle sensor 13, the yaw rate signal Y corresponding to the yaw rotational direction and the yaw rate from the yaw rate sensor 14, the vehicle speed signal V according to the speed of the vehicle from the vehicle speed sensor 25, and the wheel speed signal VH corresponding to the rotational speed of the wheel from the wheel speed sensor 26. The control signal Co1 is supplied to the main mode converting unit 20a.

The main motor control unit 17a comprises a calculation circuit, a comparator and memories such as ROMs storing torque control amounts in correspondence with the steering torque T1 which is set in advance based on experiments, theoretical calculations, steering angle correction amounts corresponding to the steering angle D, vehicle behavior correction amounts in correspondence with the yaw rate Y, and steering angle control amounts in correspondence with the vehicle speed V or the wheel speed VH, and outputs the control amount signal Co1 by selecting a control amount in correspondence with input signals from the respective sensors. The control signal Co1 is supplied to the main motor driving unit 16a via the main mode converting unit 20a. The control signal Co1 is calculated by determining a basic control amount by the torque control amount and the vehicle speed control amount and correcting the basic control amount by the steering angle correction amount and the vehicle behavior correction amount.

The main motor control unit 17*a* supplies a failure signal Tta of the steering torque sensor to the main failure detecting unit 18*a* when upper and lower voltage values of the torque signal T1 from the main steering torque sensor 12*a* is out of an allowable range or when an average voltage is abnormally different.

The main motor control unit 17*a* compares the vehicle speed signal V from the vehicle speed sensor 25 with the wheel speed signal VH from the wheel speed sensor 26 and determines failure of the sensors per se. A determining signal Tv is supplied to the main failure detecting unit 18*a*. Further, the main motor control unit 17*a* diagnoses an output value, offset or the like of the vehicle speed sensor 25.

Further, the main motor control unit 17*a* supplies a failure signal Td of the steering angle sensor to the main failure detecting unit 18*a* when the signal D from the steering angle sensor 13 is out of an allowable range.

Still further, the main motor control unit 17*a* supplies a failure signal Ty of the yaw rate sensor to the main failure detecting unit 18*a* when the yaw rate signal Y from the yaw rate sensor 14 is out of an allowable range.

Still further, the main motor control unit 17*a* supplies a failure signal to the main failure detecting unit 18*a* also when the respective sensors (including harness) are disconnected or brought into contact with the ground.

Still further, the main motor control unit 17*a* checks the VGS position sensor 27 by the position signal P from the VGS position sensor 27 and supplies the VGS control operation circuit 23 with a VGS operation signal Pc based on a deviation between a target steering angle ratio determined by the vehicle speed signal V and the vehicle speed sensor 13 and an actual steering angle ratio (position signal) from the VGS position sensor 27.

The main direction determining circuit 19*a* supplies a direction signal Tld to the main motor driving unit 16*a* independently when the main motor control unit 17*a* or the main mode converting unit 20*a* is in failure and prevents the motor 10 from being supplied with an abnormal signal even when the main motor control unit 17*a* or the main mode converting unit 20*a* is in failure and the main failure detecting unit 18*a* supplies the abnormal signal to the main motor driving unit 16*a*.

The main direction determining circuit 19*a* receives the torque signal T1 in accordance with the rotational steering direction from the main steering torque sensor 12*a* and supplies a failure signal Ttd1 of the main steering torque sensor 12*a* to the main failure detecting unit 18*a* when there occurs no change in voltage above and below a zero point. Further, the main direction determining circuit 19*a* supplies the failure signal Ttd1 to the main failure detecting unit 18*a* also when the main direction determining circuit 19*a* per se is in failure.

The main failure detecting unit 18*a* comprises a transmitting circuit and a comparing circuit for detecting failure of various sensors by receiving the failure signal Tta (steering torque sensor), the failure signal Td (steering angle sensor), the failure signal Ty (yaw rate sensor) and the failure signal Tv (vehicle speed sensor 25 and/or vehicle wheel sensor 26) from the main motor control unit 17*a*.

Further, the main failure detecting unit 18*a* detects failure of the main steering torque sensor 12*a* by receiving the failure signal Ttd1 from the main direction determining circuit 19*a* and detects failure of the main direction determining circuit 19*a* per se when an output voltage from the main direction determining circuit 19*a* is null or abnormal.

Further, a failure detecting signal Mct from the main failure detecting unit 18*a* is supplied to the main motor control unit 17*a*. The main motor control unit 17*a* detects abnormality of the failure detecting signal Mct (e.g., Vpp, pulse width, frequency or the like of PWM) and outputs the motor control signal Co1 for controlling the motor 10.

Further, the main failure detecting unit 18*a* ranks failure of various sensors and other circuits in accordance with the location of failure or degree of failure and supplies a mode converting signal Mma to the main mode converting unit 20*a* in accordance with the ranking.

Further, the main failure detecting unit 18*a* detects failure of the main mode converting unit 20*a* by receiving a feedback signal Tma from the main mode converting unit 20*a* based on the motor control signal Co1 supplied form the main motor control unit 17*a* to the main mode converting unit 20*a* and the mode converting signal Mma supplied from the main failure detecting unit 18*a* to the main mode converting unit 20*a*.

Further, the main failure detecting unit 18*a* supplies a switch drive signal Mca to an opening and closing switch driving circuit (not illustrated) for driving an opening and closing switch (not illustrated) installed between an H bridge circuit using FET provided to the main motor driving unit 16*a* and the power source 30 for driving the motor.

Further, the main failure detecting unit 18*a* detects failure of the main motor driving unit 16*a* by receiving a feedback signal Tb1 from the main motor driving unit 16*a* based on a mode signal Cma supplied from the main mode converting unit 20*a* to the main motor driving unit 16*a* and the signal Mca supplied from the main failure detecting unit 18*a* to the main motor driving unit 16*a*. Further, the main failure detecting unit 18*a* can also detect the failure of the main motor driving unit 16*a* by receiving the feedback signal Tb1 from the main motor driving unit 16*a* by an amount of change in current, voltage or the like supplied from the power source 30 to the main motor driving unit 16*a*.

When a CPU for the main failure detecting unit 18*a* and the main electronic control unit 15*a* is in failure, the signal Mca is not outputted (potential 0) from the main failure detecting unit 18*a* to the main motor driving unit 16*a* and accordingly, the main motor driving unit 16*a* is brought into a breakdown state. However, the signal Mca in this case (low level) is reverted by an inverter 18*c* and is supplied to a secondary motor driving unit 16*b* of the secondary control unit 15*b* as a signal Mcn (high level). As a result, the motor 10 is continuously driven by the secondary control unit 15*b*.

According to the ranking by location of failure, degree of failure or the like, as shown by the following items (1) and (2), the larger the degree of failure, the larger the numerical value.

(1) Minor failure in parts of the main control unit 15*a*:

Such a minor failure is one capable of continuing control of the motor 10 in which the assist ratio is not changed, correction of the steering angle correction amount and the vehicle behavior correction amount is not carried out, the feeling performance is deteriorated and so on. For example, in this case, the yaw rate sensor 14, the steering angle sensor 13, the vehicle speed sensor 25 or the like are in failure and control based on these sensors is not carried out (hereinafter, the control method is referred to as complimentary control). However, a driver or the like is made recognize the failure by a visual or audio method such as flickering an alarm lamp or by a buzzer, voice over a speaker or the like. Further, upon failure of the vehicle speed sensor 25, a signal from the wheel speed sensor 26 is substituted for a signal thereof or the vehicle speed is fixed to 40 km/h.

(2) Serious failure in parts of the main control unit 15a:

Such a serious failure is one incapable of continuing control of the motor 10 and the control is carried out by switching over to the secondary control unit 15b. The serious failures are, for example, failures of the main steering torque sensor 12a, the H bridge circuit, opening of a harness and so on. Further, although normal control can be carried out by the secondary control unit 15b, in order to inform the failure to a driver, the motor 10 is controlled by changing the assist ratio to about ½. Similarly, a driver is made recognize the failure by visual or audio method such as flickering an alarm lamp or by a buzzer, voice over a speaker or the like.

Note that in the system control method in respect of the failure, the complimentary control is persistently carried out by the main control unit 15a and when the complimentary control by the main control unit 15a cannot be continued, the complimentary control is carried out by the secondary control unit 15b. When the control cannot be carried out by the secondary control unit 15b, manual steering operation is carried out by the VGS.

The main control unit 15a and the secondary control unit 15b monitor failure of each other and therefore, during a time period in which the control is carried out by the main control unit 15a, when the secondary control unit 15b is in failure, although there is no inconvenience in the actual operation, in order to inform the failure to a driver, the control is carried out by particularly changing the assist ratio to about ½.

The main mode converting unit 20a receives the motor control signal Co1 which has been calculated for control at the main motor control unit 17a based on information from the various sensors and outputs the motor control signal Co1 as it is as the mode signal Cma when no failure occurred. The mode signal Cma is supplied to the main motor driving unit 16a.

Upon receiving the mode converting signal Mma from the main failure detecting unit 18a, the main mode converting unit 20a changes the pulse width of the control signal Co1 of the motor 10 comprising the PWM signal from the main motor control unit 17a and supplies the mode signal Cma produced by PWM control of about ½ to the main motor driving unit 16a.

The main mode converting unit 20a supplies the feedback signal Tma to the main failure detecting unit 18a based on the motor control signal Co1 from the main motor control unit 17a and the mode converting signal Mma from the main failure detecting unit 18a.

The main motor driving unit 16a comprises the H bridge circuit, opening and closing switches and circuits for driving opening and closing switches. The main motor driving unit 16a drives the motor 10 by outputting the motor drive signals Mol and Mor for switching current from the power source 30 (DC12V) by the switch drive signal Mca from the main failure detecting unit 18a based on the drive signal Cma from the main mode converting unit 20a.

The main motor driving unit 16a supplies the feedback signal Tb1 to the main failure detecting unit 18a based on the mode signal Cma from the main mode converting unit 20a and the signal Mca from the main failure detecting unit 18a.

Further, the main failure detecting unit 18a can detect failure of the main motor driving unit 16a based on the feedback signal Tb1 from the main motor driving unit 16a also by an amount of change in current or voltage supplied from the power source 30.

The bridge circuit of the main motor driving unit 16a comprises four FETs (including inverse direction diode). The motor control signal Cma inputted to the main motor driving unit 16a comprises, for example, a direction signal for controlling the rotational direction of the motor 10 and a PWM signal for controlling the amounts of drive of the motor 10 (drive torque and rotational number).

The VGS control operation circuit 23 outputs a VGS control signal Po by calculating an amount of drive of the VGS motor based on the VGS operation signal Pc which is an absolute value of an amount for changing the VGS position supplied from the main motor control unit 17a. The VGS control signal Po is supplied to a VGS driving unit 21 of the secondary control unit 15b.

The inverter 18c converts the failure signal Mca outputted from the main failure detecting unit 18a into the failure signal Mcn by reverting it. The converted failure signal Mcn is supplied to a logical product operator 18d of the secondary control unit 15b. When the main control unit 15a fails and is switched over to the secondary control unit 15b, the signal Mcn (high level) from the inverter 18c of the main control unit 15a and a signal Mcb from a secondary failure detecting unit 18b of the secondary control unit 15b are supplied to the logical product operator 18d. When both signals are at high level, a high level signal Mc is supplied to the secondary motor driving unit 16b and the motor 10 is driven by the PWM signal.

The secondary control unit 15b is basically constituted by a microprocessor and is provided with a secondary motor control unit 17b, the secondary motor driving unit 16b, the secondary failure detecting unit 18b, a secondary mode converting unit 20b, the VGS driving unit 21, a secondary direction determining circuit 19b and the logical product operator 18d. The secondary control unit 15b outputs the motor drive signals Mol and Mor for driving the motor 10 based on signals from the secondary steering torque sensor 12b, the vehicle speed sensor 25, the wheel speed sensor 26 and the VGS position sensor 27. In this case, Mor represent the motor drive signal of clockwise rotation while Mol represents the motor drive signal of counterclockwise rotation.

The VGS control signal Po from the VGS control operation circuit 23 of the main control unit 15a and a VGS operation signal Pc from the secondary motor control unit 17b of the secondary control unit 15b are supplied to the VGS driving unit 21. The VGS driving unit 21 drives the VGS motor 28 for varying the gear ratio of the variable gear ratio steering mechanism (VGS) based on the VGS control signal Po and the VGS operation signal Pc.

The secondary motor control unit 17b outputs a motor control signal Co2 which is a motor control amount in correspondence with change amounts based on respective directions and absolute values on the basis of a torque signal T2 corresponding to the torque amount from the secondary steering torque sensor 12b, the wheel speed signal VH in correspondence with the rotational speed of the wheel from the wheel speed sensor 26, the VGS position signal P corresponding to a variable amount and a variable direction from the VGS position sensor 27 and the vehicle speed signal V in accordance with the speed of the vehicle from the vehicle speed sensor 25. The motor control signal Co2 is supplied to the secondary mode converting unit 20b.

That is, the secondary motor control unit 17b comprises a calculation unit, a comparison unit, memories such as ROMs storing data of a torque control amount in correspondence with the steering torque T2 which has been set in advance based on experiments, theoretical calculations or the like, a steering angle control amount in correspondence with the vehicle speed V or the wheel speed VH, a vehicle speed amount in correspondence with the VGS position P and so on, outputs the motor control signal Co2 by selecting a control amount in correspondence with an input of the respective signals, and supplies it to the secondary motor driving unit 16b via the secondary mode converting unit 20b.

Further, the secondary motor control unit 17b checks the VGS position sensor 27 based on the position signal P from the VGS position sensor 27 and supplies the VGS operation signal Pc based on a deviation between a target steering angle ratio determined by the vehicle speed signal V from the vehicle speed sensor 25 and the actual steering angle ratio (position signal) from the VGS position sensor 27.

The secondary motor control unit 17b supplies a failure signal Ttb of the steering torque sensor to the secondary failure detecting unit 18b when upper and lower voltages of the signal T2 from the secondary steering torque sensor 12b is out of an allowable range or when an average voltage is abnormally different.

Further, the secondary motor control unit 17b compares the wheel speed signal VH from the wheel speed sensor 26 with the vehicle speed signal V from the vehicle speed sensor 25, determines that the sensor per se is in failure depending on a result of comparison, and supplies a signal Tcv of the result of determination to the secondary failure detecting unit 18b.

Further, the secondary motor control unit 17b supplies a failure signal Tp of the VGS position sensor to the secondary failure detecting unit 18b when the position signal P from the VGS position sensor 27 is out of an allowable range of the position.

Further, the secondary motor control unit 17b supplies a failure signal to the secondary failure detecting unit 18b when the respective sensors (including harness) are disconnected or brought into contact with the ground.

The secondary direction determining circuit 19b supplies a direction signal T2d to the secondary motor driving unit 16b independently even when the secondary motor control unit 17b and the secondary mode converting unit 20b are in failure and prevents the motor 10 from being supplied with an abnormal signal even when the secondary motor control unit 17b and the secondary mode converting unit 20b are in failure and the abnormal signal is supplied to the secondary motor driving unit 16b.

The secondary direction determining unit 19b receives the torque signal T2 corresponding to a rotational steering direction from the secondary steering torque sensor 12b and supplies a failure signal Ttd2 to the secondary failure detecting unit 18b as the secondary steering torque sensor 12b is in failure when there occurs no change in voltage above and below a zero point. The secondary direction determining circuit 19b supplies the failure signal Ttd2 to the secondary failure detecting unit 18b even when the secondary direction determining circuit 19b per se is in failure.

The secondary failure detecting unit 18b comprises a transmitting circuit and a comparing circuit and detects failure of the various sensors by receiving the failure signal Ttb (failure of steering torque sensor), the failure signal Tcv (failure of the wheel speed sensor 26 and/or the vehicle speed sensor 25) and the failure signal Tp (failure of the VGS position sensor 27) from the secondary motor control unit 17b.

Further, the secondary failure detecting unit 18b detects the failure of the secondary steering torque sensor 12b by receiving the failure signal Ttd2 from the secondary direction determining circuit 19b and detects the failure of the secondary direction determining circuit 19b per se when voltage from the secondary direction determining circuit 19b is null or abnormal.

A failure detecting signal Sct from the secondary failure detecting unit 18b is supplied to the secondary motor control unit 17b. The secondary motor control unit 17b detects abnormality (for example, Vpp, pulse width, frequency or the like of PWM) of the failure detecting signal Sct and outputs the motor control signal Co2 for controlling the motor 10.

Further, the secondary failure detecting unit 18b ranks failures of the various sensors and other circuits in accordance with location of failure, degree of failure or the like and supplies a mode converting signal Mmb to the secondary mode converting unit 20b in accordance with the ranking.

Further, the secondary failure detecting unit 18b detects failure of the secondary mode converting unit 20b by receiving a feedback signal Tmb from the secondary mode converting unit 20b based on the motor control signal Co2 supplied from the secondary motor control unit 17b to the secondary mode converting unit 20b and the mode converting signal Mmb supplied from the secondary failure detecting unit 18b to the secondary mode converting unit 20b.

The secondary failure detecting unit 18b supplies the switch drive signal Mcb (high level) to an opening and closing switch driving circuit (not illustrated) for driving an opening and closing switch (not illustrated) installed between an H bridge circuit using FET provided to the secondary motor driving unit 16b and the power source 30 for driving the motor via the logical product operator 18d.

The signal Mcb (high level) and the signal Mcn (high level) which has been reverted by the inverter 18c when the main control unit 15a is in failure, are supplied to the logical product operator 18d. The signal Mc (high level) calculated by the logical product operator 18d is supplied to the secondary motor driving unit 16b for driving the motor 10.

The secondary failure detecting unit 18b detects failure of the secondary motor driving unit 16b by receiving a feedback signal Tb2 outputted from the secondary motor driving unit 16b based on a mode signal Cmb supplied from the secondary mode converting unit 20b to the secondary motor driving unit 16b and the signal Mc supplied from the secondary failure detecting unit 18b to the secondary motor driving unit 16b via the logical product operator 18d. Further, the secondary failure detecting unit 18b can detect failure of the secondary motor driving unit 16b by receiving the feedback signal Tb2 from the secondary motor driving unit 16b also by an amount of change of current, voltage or the like supplied from the power source 30.

Further, when a CPU for the secondary failure detecting unit 18b and the secondary control unit 15b are in failure, the failure detecting unit 18b does not output the signal Mcb to the secondary motor driving unit 16b (potential 0=low level). Therefore, the signal Mc from the logical product operator 18d becomes low level, the secondary motor driving unit 16b is not operated, and EPS is brought into a breakdown state.

According to the ranking by the location of failure, degree of failure or the like, as shown by the following items (1) and (2), the larger the degree of failure, the larger the numerical value.

(1) Minor failure of parts of the secondary control unit 15b:

Such a minor failure is a failure allowing continued control of the motor 10 in which, for example, the feeling performance is deteriorated, and specifically, the VGS position sensor or the like is in failure. In such a failure, the control is switched over to the main control unit 15a, the complimentary control by the main control unit 15a is carried out, and the assist ratio is not changed. A driver is made recognize the failure by a visual or audio method such as flickering of an alarm lamp or by a buzzer, voice over a speaker or the like.

(2) Serious failure of parts of the secondary control unit 15b:

Such a serious failure is a failure not allowing continued control of the motor 10 in which, for example, the secondary steering torque sensor 12b, the secondary direction determining circuit 19b, the H bridge circuit or the like are in failure. In this case, the control is carried out by switching the control over to the main control unit 15a.

However, although normal control can be carried out by the main control unit 15a, in order to inform the failure to the driver, the control is carried out by particularly switching the assist ratio to about ½. In addition, the driver is made recognize the failure by a visual method such as flickering of an alarm lamp as well as a audio method using a buzzer, voice over a speaker or the like.

The secondary motor converting unit 20b receives the motor control signal Co2 which has been calculated for control at the secondary motor control unit 17b based on information from the various sensors and outputs the motor control signal Co2 as it is as the mode signal Cmb when no failure is caused. The mode signal Cmb is supplied to the secondary motor driving unit 16b.

Further, upon receiving the mode converting signal Mmb from the secondary failure detecting unit 18b, the secondary converting unit 20b changes the pulse width of the motor control signal Co2 comprising a PWM signal or the like from the secondary motor control unit 17b and supplies the signal Cmb in which PWM control of about ½ is carried out, to the secondary motor driving unit 16b.

The secondary mode converting unit 20b supplies the feedback signal Tmb to the secondary failure detecting unit 18b based on the motor control signal Co2 from the secondary motor control unit 17b and the mode converting signal Mnb from the secondary failure detecting unit 18b.

The secondary motor driving unit 16b comprises the H bridge circuit, opening and closing switches, and opening and closing switch driving circuits. The secondary motor driving unit 16b drives the motor 10 by outputting the motor drive signals Mol and Mor for switching current from the power source 30 (DC12V) based on the drive signal Cmb outputted from the secondary mode converting unit 20b by closing the opening and closing switch by the drive signal Mc based on the switch drive signal Mcb (high level) from the secondary failure detecting unit 18b and the failure signal Mcn (high level) outputted from the inverter 18c when the main control unit 15a is in failure.

The VGS driving unit 21 is provided with a VGS drive circuit 22 and a VGS control circuit 24, diagnoses failure of the VGS position sensor 27 by comparing the VGS control signal Po from the VGS control operation circuit 23 of the main control unit 15a with the VGS operation signal Pc from the secondary motor control unit 17b, calculates a drive amount and a rotational direction of the VGS motor based on the VGS operation signal Pc, and supplies signals of +Mv and −Mv to the VGS motor.

The VGS control circuit 24 comprises a calculation circuit, a comparing circuit, and a ROM storing data which has been set in advance based on experiments, theoretical calculations or the like, outputs a control signal Vm of VGS by selecting a control amount in correspondence with the VGS operation signal Pc, and supplies it to the VGS drive circuit 22.

The VGS drive circuit 22 comprises an H bridge circuit using FETs and a current detecting circuit, converts current from the power source 30 (DC12) into a PWM signal by switching it by the H bridge circuit in accordance with the control signal Vm from the VGS control circuit 24, outputs the signals +Mv and −Mv for driving the VGS motor, and drives the VGS motor 28 by the PWM signal.

The VGS drive circuit 22 supplies the PWM signal based on the control signal Vm from the VGS control circuit 24 to the secondary failure detecting unit 18b as a feedback signal Tvg and the secondary failure detecting unit 18b detects, for example, abnormality of voltage value, pulse width, frequency or the like of PWM. Further, the secondary failure detecting unit 18b detects failure of the VGS drive circuit 22 based on the feedback signal Tvg also by an amount of change in current, voltage or the like supplied from the power source 30.

The logical product operator 18d outputs the signal Mc at high level to the secondary motor driving unit 16b only when both the signal Mcn and the signal Mcb are at high level based on the failure signal Mcn outputted from the inverter 18c of the main control unit 15a and the switch drive signal Mcb outputted from the secondary failure detecting unit 18b. When either of the signal Mcn and the signal Mcb is at low level, the logical product operator 18d outputs the signal Mc at low level to the secondary motor driving unit 16b.

That is, only when the main control unit 15a is in failure, the logical product operator 18d supplies the switch driving signal Mc (H) to the opening and closing switch (not illustrated) of the secondary motor driving unit 16b provided between the H bridge circuit and the power source 30 for driving the motor, supplies the power source 30 to the H bridge circuit by closing the opening and closing switch, and drives the motor 10 based on the PWM signal.

At a normal occasion in which the main control unit 15a is not in failure, the motor 10 is driven by current, PWM-controlled by the secondary motor driving unit 16b, from the power source 30.

When the main control unit 15a is in minor failure, the motor 10 is driven by being supplied with power which has been subjected to PWM-control of about ½ by the secondary motor driving unit 16b.

Further, when the main control unit 15a is in failure, the motor 10 is controlled by the secondary control unit 15b and the motor 10 is driven based on current which has been subjected to PWM control of about ½ by the secondary motor driving unit 16b.

The VGS motor 28 is provided for rotating a cam for making variable the gear ratio in the variable gear ratio steering mechanism disposed in the steering gearbox for making variable the gear ratio by an amount of eccentricity in respect of an amount of rotational movement of gears.

The VGS motor 28 is driven by the drive signals +Mv and −Mv produced by converting current of the power source 30 (DC12V) into a PWM signal by switching the current by the H bridge circuit installed to the VGS drive circuit 22 based on the control signal Vm from the VGS control circuit 24.

When the main control unit 15a is in failure and the backup secondary control unit 15b receives a failure signal, a VGS motor drive circuit system, comprising the VGS control calculation circuit 23, the VGS control circuit 24 and the VGS drive circuit 22, is arranged to allow continued driving of the VGS motor 28.

From the power source 30, power is supplied to the main control unit 15a by a main power source system Ve1 via a fuse 31 for the main control unit 15a. Further, power of the secondary control unit 15b is supplied by a secondary power source system Ve2 via a fuse 32 for the secondary control unit 15b from the power source 30.

In the above-described electric power steering apparatus, failure of various sensors, parts and the like is always checked in an initial check done at a time point when a key switch of the vehicle is inserted, at every loop or at every constant time period in correspondence with a degree of importance in respect of the failure.

For example, ON failure of an FET used in the H bridge circuits of the main and the secondary control units and VGS, failure of EEPROM (Electrically Erasable and Programmable ROM) of the main and secondary control units and so on are diagnosed once during initialization.

Concerning the diagnosis of failure in the comparison of the vehicle speed sensor 25 with the wheel speed sensor 26, the failure is checked with a long time pan of every 50 msec for the purpose of background processing.

For diagnosing signal values of the steering torque sensors (12a, 12b), diagnosing the average voltage and diagnosing the upper and lower voltages, diagnosing failure of opening/short-circuitting of the direction determining circuits (19a, 19b) or harness, both of checking at initialization and checking at every one loop (for example, 1 msec) are carried out.

Further, for diagnosing failure of a secondary CPU or a secondary power source system, both of checking at initialization and checking with a long time span of every 50 msec for the purpose of background processing are carried out.

For diagnosing failure of the CPUs of the main and the secondary EPS control units, checking at initialization, checking at every one loop (1 msec) and checking with a long span of every 50 msec for the purpose of background processing are carried out.

Figure 3:
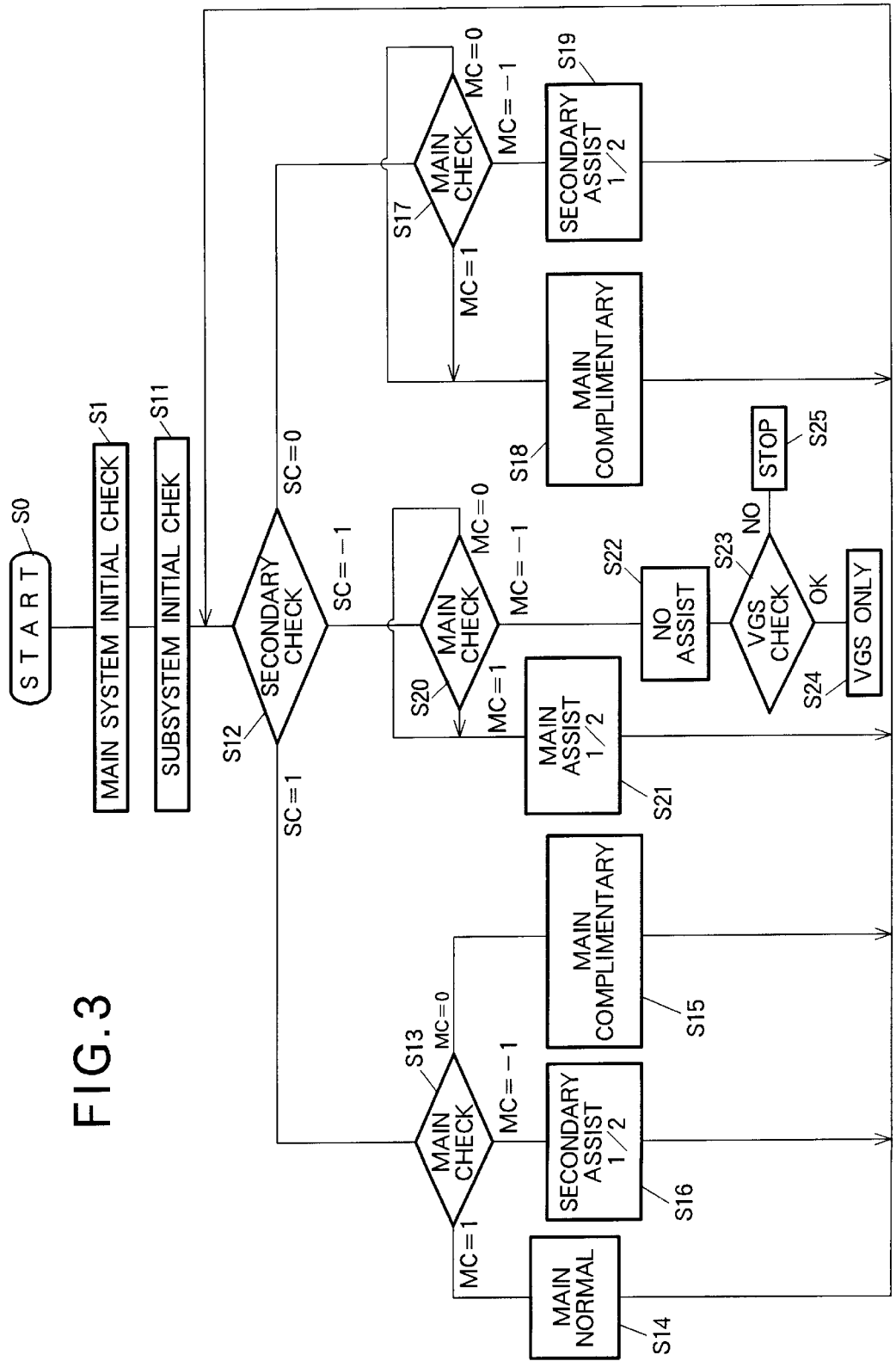
FIG. 3 is a flowchart showing operations of main and secondary control units of FIG. 2.

Next, discussion will be made as to the operation of the electric power steering apparatus with reference to its block diagram of FIG. 2 and flowchart of FIG. 3.

When a switch of an ignition key (not illustrated) is turned ON, the main power source Ve1 and the secondary power source Ve2 are supplied from the power source 30 of battery respectively to the main control unit 15a and the secondary control unit 15b via the fuse 31 and the fuse 32 and the apparatus is started (step S0).

At step S1, checking of the various sensors, basic checking of the main motor control unit 17a, the main direction determining circuit 19a, the main failure detecting unit 18a, the main mode converting unit 20a and the main motor driving unit 16a constituting the main control unit 15a, and checking of a state of applying the main power source Ve1 are carried out.

At step S11, basic checking of the secondary motor control unit 17b, the secondary direction determining circuit 19b, the secondary failure detecting unit 18b, the secondary mode converting unit 20b and the secondary motor driving unit 16b constituting the secondary control unit 15b, and checking of a state of applying the secondary power source Ve2 are carried out.

At step S12, secondary checking of the secondary motor control unit 17b is carried out at the secondary failure detecting unit 18b in which three stages of determination are carried out in accordance with degree of failure.

According to determination at three stages in the secondary check, there are a state where no failure is caused (determination SC=1), a complimentary control state where minor failure in a part occurs, the control can be continued and the assist ratio is not changed (determination SC=0) and a state where serious failure arises and the control cannot be continued (determination SC=−1). In this case, SC=1 represents "no secondary failure", SC=0 represents "failure capable of continuing secondary control", and SC=1 represents "failure incapable of continuing secondary control".

When the determination is SC=1 in step S12, the operation proceeds to step S13 and at step S13, main check of the main motor control unit 17a is carried out by the main failure detecting unit 18a and determination of three stages is carried out in accordance with degree of failure.

According to determination of three stages in the main check, there are a state where no failure is caused (determination MC=1), a complimentary state where minor failure of a part is caused, the control can be continued and the assist ratio is not changed (determination MC=0) and a state where serious failure is caused and the control cannot be continued (determination MC=−1). In this case, MC=1 represents "no main failure is caused", MC=0 represents "failure capable of continuing main control" and MC=−1 signifies "failure incapable of continuing main control". Further, the determination of three stages of main check is similarly carried out also at step S17 and step S20.

When the determination is MC=1 at step S13, the operation proceeds to step S14 and normal control by the main system is carried out, when the determination is MC=0, the operation proceeds to step S15 and complimentary control where the assist ratio is not changed is carried out and when the determination is MC=−1, the operation proceeds to step S16 and the assist ratio of the motor 10 is controlled to switch to ½ by the secondary mode converting unit 20b.

When the determination is SC=−1 in step S12, the operation proceeds to step S20 and main check is carried out.

When the determination is MC=1 and MC=0 at step S20, the operation proceeds to step S21, the assist ratio of the motor 10 is controlled to switch to ½ by the main mode converting unit 20a and when the determination is MC=−1, the operation proceeds to step S22 and prohibits the assist operation.

When the assist operation is prohibited at step S22, the operation proceeds to step S23 and checking of VGS is carried out. When the VGS checking is OK at step S23, the operation proceeds to step S24 and the operation is carried out only by the VGS. Meanwhile, when the VGS checking is NO, the operation of the apparatus is stopped.

When the determination is SC=0 at step S12, the operation proceeds to step S17 and main check is carried out.

When the determination is MC=1 and MC=0 at step S17, the operation proceeds to step S18 and complimentary control in which the assist ratio is not changed is carried out and when the determination is MC=−1, the operation proceeds to step S19 and the assist ratio of the motor 10 is controlled to switched to ½ by the secondary mode converting means 20b.

Obviously, various minor changes and modifications of the present invention are possible in the light of the above teaching. It is therefore to be understood that within the scope of the appended claims the invention may be practiced otherwise than as specifically described.

What is claimed is:

1. An electric power steering apparatus for use on a vehicle, comprising:

a motor for applying an auxiliary torque to a steering system of said vehicle;

a steering torque sensor for detecting a steering torque of said steering system; and a control unit having a motor control unit for drive-controlling said motor based on at least a steering torque signal from said steering torque sensor and a failure detecting unit for detecting a failure of said apparatus, wherein, based on a failure detection signal from said failure detecting unit, said motor control unit can be switched over from a normal control mode in which no failure exists in said apparatus to a first failure mode in which a certain failure exists in said apparatus and an assist ratio is changed relative to said normal control mode.

2. An electric power steering apparatus for use on a vehicle, comprising:

a motor for applying an auxiliary torque to a steering system of said vehicle;

a steering torque sensor for detecting a steering torque of said steering system; and a control unit having a motor control unit for drive-controlling said motor based on at least a steering torque signal from said steering torque sensor and a failure detecting unit for detecting a failure of said apparatus;

wherein each of said motor control unit and said failure detecting unit is provided in a couple, one of said two motor control units performs its control operation in a normal control mode when neither of said failure detecting units detects a failure, and the other of said two motor control units performs its control operation in a first failure control mode in which an assist ratio differs from that of the normal control mode when one of said two failure detecting units detects a certain failure.

3. An electric power steering apparatus according to claim 2, wherein when said two failure detecting units detected a minor failure, said one of said two motor control units performs its control operation in a second failure control mode in which an assist ratio is no different from that of said normal control mode.

4. An electric power steering apparatus for use on a vehicle, comprising:

a motor for applying an auxiliary torque to a steering system of said vehicle;

a steering torque sensor for detecting a steering torque of said steering system; and a control unit having a motor control unit for drive-controlling said motor based on at least a steering torque signal from said steering torque sensor and a failure detecting unit for detecting a failure of said apparatus;

wherein each of said motor control unit and said failure detecting unit are provided in a couple, one of said two motor control units performs its control operation in a normal control mode when neither of said two failure detecting units detects a failure, and said one of said two motor control units performs its control operation in a first failure control mode in which an assist ratio differs from that of said normal control mode when the other of said two failure detecting units detects a certain failure.

5. An electric power steering apparatus according to claim 4, wherein when said two failure detecting units detect a minor failure, said one of said two motor control units performs its control operation in a second failure control mode in which an assist ratio is no different from that of said normal control mode.

* * * * *